United States Patent
Wilson et al.

(10) Patent No.: US 11,362,878 B2
(45) Date of Patent: Jun. 14, 2022

(54) RADIO (NR) REMAINING MINIMUM SYSTEM INFORMATION (RMSI) MULTIPLEXING AND PERIODICITY CONSIDERATIONS

(71) Applicant: QUALCOMM Incorporated, San Diego, CA (US)

(72) Inventors: Makesh Pravin John Wilson, San Diego, CA (US); Tao Luo, San Diego, CA (US); Hung Dinh Ly, San Diego, CA (US); Muhammad Nazmul, Littleton, MA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/197,085

(22) Filed: Nov. 20, 2018

(65) Prior Publication Data
US 2019/0158336 A1    May 23, 2019

Related U.S. Application Data

(60) Provisional application No. 62/590,018, filed on Nov. 22, 2017.

(51) Int. Cl.
*H04L 27/26* (2006.01)
*H04W 48/16* (2009.01)
(Continued)

(52) U.S. Cl.
CPC ............ *H04L 27/2676* (2013.01); *H04J 3/06* (2013.01); *H04L 5/0053* (2013.01);
(Continued)

(58) Field of Classification Search
CPC .. H04J 11/0069; H04J 2011/0096; H04J 3/06; H04L 2/0008; H04L 27/0012;
(Continued)

(56) References Cited

U.S. PATENT DOCUMENTS

| | | |
|---|---|---|
| 10,791,550 B2 * | 9/2020 | Ko ........................ H04L 5/0048 |
| 2003/0002591 A1 * | 1/2003 | Boneh ................ H04B 7/18517 |
| | | 375/295 |

(Continued)

OTHER PUBLICATIONS

Huawei et al., "RMSI Delivery", 3GPP Draft, R1-1719372, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369281, 9 Pages, Retrieved from the Internet: URL:http://www.3gpp.org/ftp/tsg%5Fran/WG1%5FRL1ITSGR1%5F91/Docs/ [retrieved on Nov. 18, 2017].

(Continued)

*Primary Examiner* — Nishant Divecha
(74) *Attorney, Agent, or Firm* — Norton Rose Fulbright LLP

(57) ABSTRACT

Techniques and devices for signaling control and system information are provided. In one aspect, a base station determines a type of multiplexing and a periodicity for transmission of remaining minimum system information (RMSI). The type of multiplexing is for multiplexing the RMSI with a synchronization signal (SS) block. The base station generates an indicator that signals the type of multiplexing and the periodicity. In another aspect, a user equipment (UE) identifies the indicator and determines the type of multiplexing and the periodicity based on the indicator. The UE processes the transmission of RMSI based on the type of multiplexing and the periodicity. Other aspects and features are also claimed and described.

19 Claims, 9 Drawing Sheets

(51) Int. Cl.
*H04W 48/12* (2009.01)
*H04L 5/00* (2006.01)
*H04J 3/06* (2006.01)

(52) U.S. Cl.
CPC ........ *H04L 5/0094* (2013.01); *H04L 27/2666* (2013.01); *H04W 48/12* (2013.01); *H04W 48/16* (2013.01)

(58) Field of Classification Search
CPC ............. H04L 27/2601; H04L 27/2676; H04L 5/0053; H04L 5/0094; H04L 27/2666; H04L 5/0048; H04W 48/12; H04W 48/16; H04W 72/0446
See application file for complete search history.

(56) References Cited

U.S. PATENT DOCUMENTS

| | | | |
|---|---|---|---|
| 2015/0049741 A1 | 2/2015 | Chen et al. | |
| 2018/0192383 A1* | 7/2018 | Nam | H04J 11/0076 |
| 2019/0132170 A1* | 5/2019 | Si | H04L 27/266 |
| 2019/0159203 A1* | 5/2019 | Kim | H04W 56/00 |
| 2019/0356524 A1* | 11/2019 | Yi | H04B 7/0617 |
| 2020/0068512 A1* | 2/2020 | Xue | H04W 56/001 |

OTHER PUBLICATIONS

International Search Report and Written Opinion—PCT/US2018/062225—ISA/EPO—dated Feb. 14, 2019.
Qualcomm Incorporated: "Remaining System Information Delivery Consideration", 3GPP Draft, R1-1718528 Remaining System Information Delivery Consideration, 3rd Generation Partnership Project (3GPP), Mobile Competence Centre, 650, Route Des Lucioles, F-06921 Sophia-Antipolis CED, vol. RAN WG1, No. Prague, Oct. 9, 2017-Oct. 13, 2017, Oct. 8, 2017 (Oct. 8, 2017), XP051341710, pp. 1-7, Retrieved from the Internet: URL:http://www.3gpp.org/ftp/Meetings_3GPP_SYNC/RAN1/Docs/ [retrieved on Oct. 8, 2017].
Xiaomi Communications: "Discussion on Remaining Details for RMSI Delivery in PBCH", 3GPP Draft, R1-1720600, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370067, 4 Pages, Retrieved from the Internet:URL:http://www.3gpp.org/ftp/tsg%5Fran/WG1%5FRL1ITSGR1%5F91/Docs/[retrieved on Nov. 18, 2017].

* cited by examiner

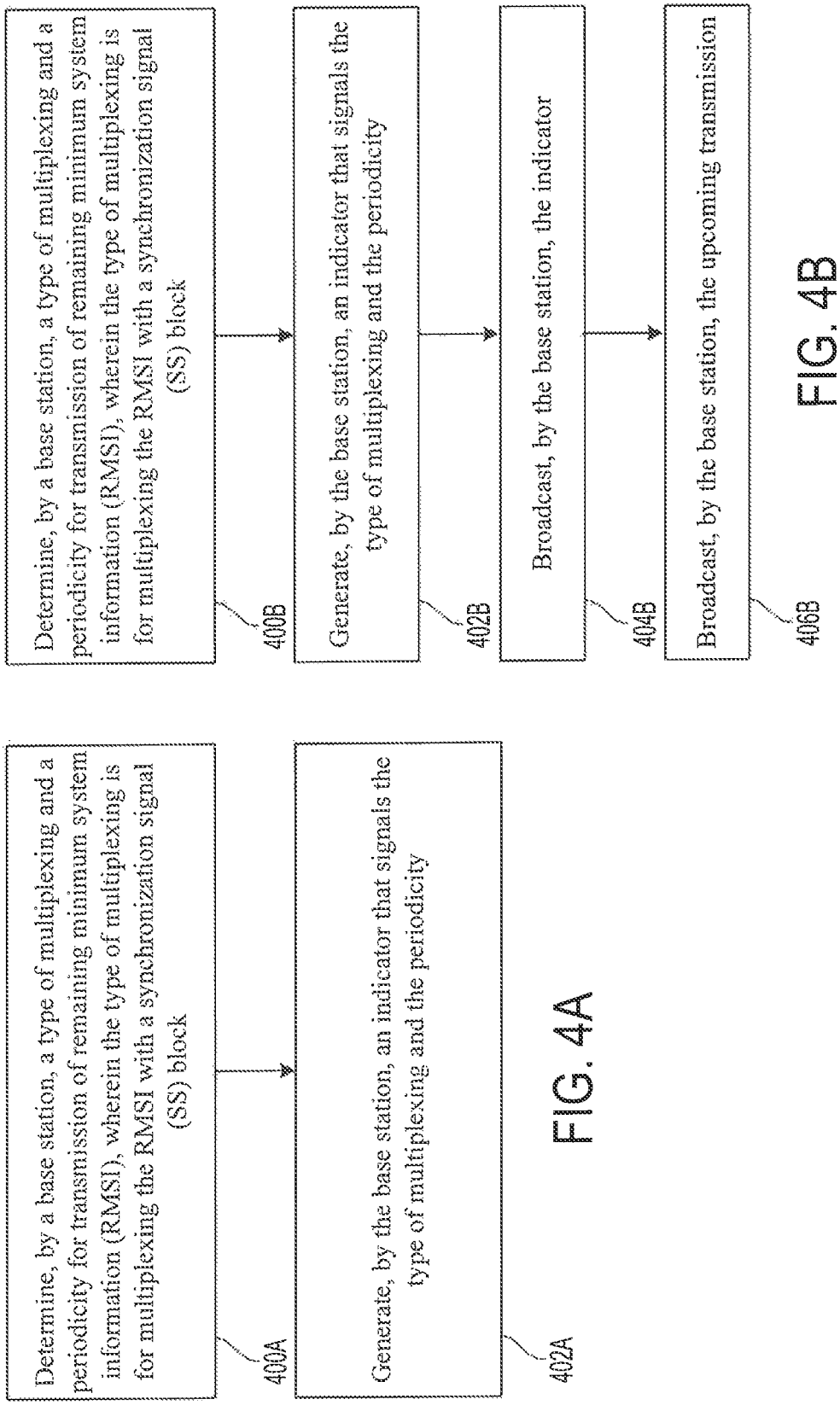

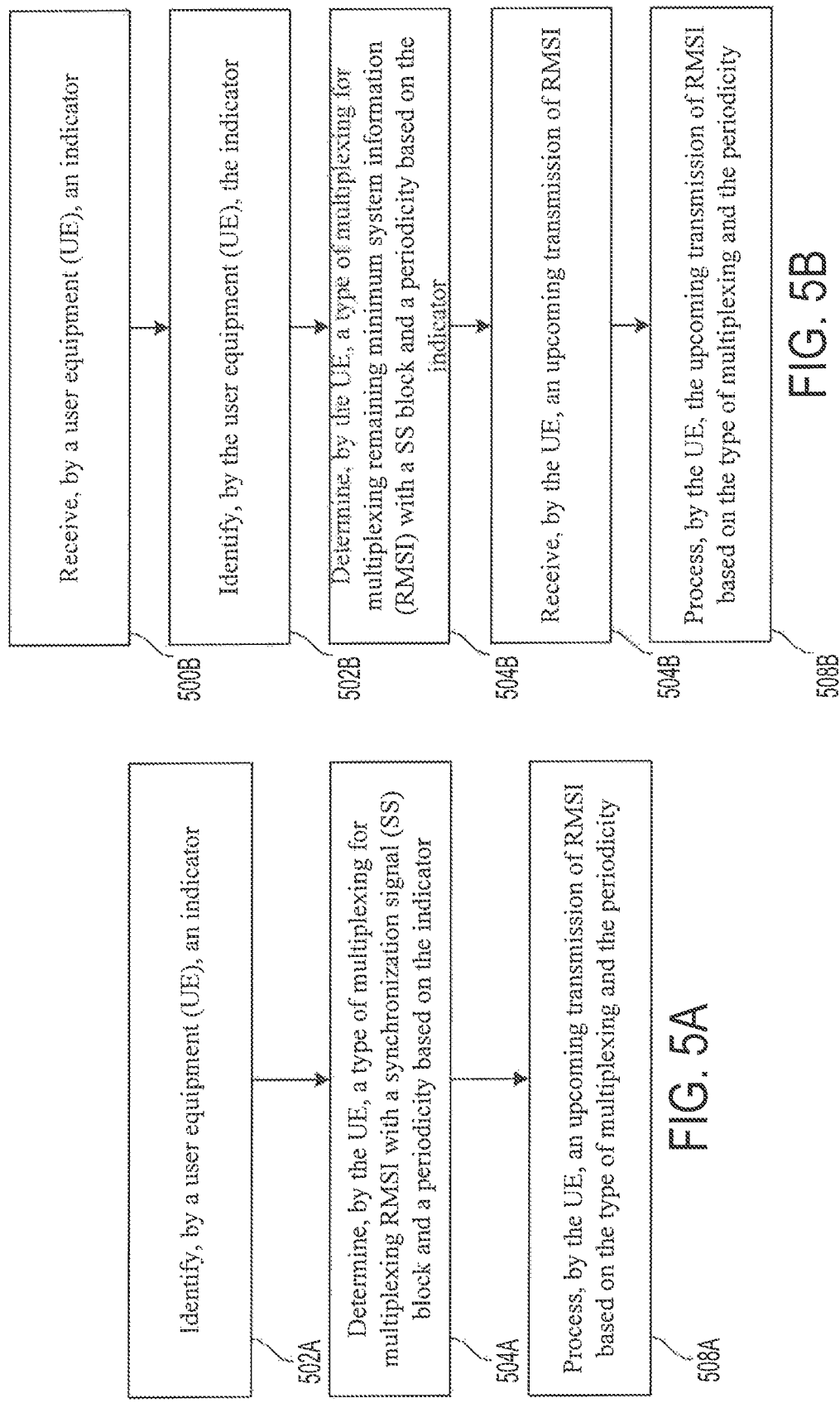

RADIO (NR) REMAINING MINIMUM SYSTEM INFORMATION (RMSI) MULTIPLEXING AND PERIODICITY CONSIDERATIONS

CROSS-REFERENCE TO RELATED APPLICATIONS

The present application claims priority to and the benefit of U.S. Provisional Patent Application No. 62/590,018, filed on Nov. 22, 2017, the disclosure of which is hereby incorporated herein by reference in its entirety as if fully set forth below and for all applicable purposes.

TECHNICAL FIELD

Aspects of the technology discussed below relate generally to wireless communication systems, and more particularly, to signaling of a type of multiplexing and periodicity of remaining minimum system information (RMSI). Embodiments can enable and provide communication devices, methods, and systems for use in a variety of wireless communication contexts (e.g., mmWave and Sub-6 GHz deployments) configured for signaling multiplexing modes (e.g., control signaling indicator(s) in PBCH can indicate RMSI coreset multiplexing mode within a synchronization block/signal), configuring a monitoring window, and periodicity. Such features aim to improve and enhance mobility and network coverage to aid in user experience improvements.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In new radio (NR), remaining minimum system information (RMSI) can be used to carry system information (SI). A physical broadcast channel (PBCH) master information block (MIB) can carry a first part of system information that a user equipment (UE) needs in order to access a network. RMSI can carry all remaining system information that a UE needs to gain access to a network. In this way, RMSI may be similar to system information blocks (SIBs) SIB1 and SIB2 in long term evolution (LTE). Yet in NR, features or mechanisms for transmitting, receiving, and identifying RMSI has yet to be fully defined or deployed. Embodiments provide these and other features as discussed below in more detail.

In one aspect of the disclosure, a method of wireless communication is provided. For example, the method can include determining, by a base station, a type of multiplexing and a periodicity for transmission of remaining minimum system information (RMSI), wherein the type of multiplexing is for multiplexing the RMSI with a synchronization signal (SS) block. The method can also include generating, by the base station, an indicator that signals the type of multiplexing and the periodicity.

In another aspect, a base station is provided. For example, the base station can have means for determining, by the base station, a type of multiplexing and a periodicity for transmission of remaining minimum system information (RMSI), wherein the type of multiplexing is for multiplexing the RMSI with a synchronization signal (SS) block. The base station can also include means for generating, by the base station, an indicator that signals the type of multiplexing and the periodicity.

In another aspect, a base station is provided. For example, the base station can include at least one processor, and at least one memory coupled to the at least one processor. The at least one processor is configured to determine, by a base station, a type of multiplexing and a periodicity for transmission of remaining minimum system information (RMSI), wherein the type of multiplexing is for multiplexing the RMSI with a synchronization signal (SS) block. The at least one processor is also configured to generate, by the base station, an indicator that signals the type of multiplexing and the periodicity.

In another aspect, a computer-readable medium is provided that has instructions recorded thereon. When enacted by one or more computer processors, the instructions cause the one or more computer processors to determine, by a base station, a type of multiplexing and a periodicity for transmission of remaining minimum system information (RMSI), wherein the type of multiplexing is for multiplexing the RMSI with a synchronization signal (SS) block. The instructions also cause the one or more computer processors to generate, by the base station, an indicator that signals the type of multiplexing and the periodicity.

In another aspect, a method of wireless communication is provided. For example, the method may include identifying, by a user equipment (UE), an indicator that signals a type of multiplexing and a periodicity for transmission, by a base station, of remaining minimum system information (RMSI), wherein the type of multiplexing is for multiplexing the RMSI with a synchronization signal SS block. The method may also include determining, by the UE, the type of multiplexing and the periodicity based on the indicator. The method may further include processing, by the UE, the transmission of RMSI based on the type of multiplexing and the periodicity.

In another aspect, a user equipment (UE) is provided. For example, the apparatus may include means for identifying, by the UE, an indicator that signals a type of multiplexing and a periodicity for transmission, by a base station, of remaining minimum system information (RMSI), wherein the type of multiplexing is for multiplexing the RMSI with a synchronization signal SS block. The UE also includes means for determining, by the UE, the type of multiplexing and the periodicity based on the indicator. The UE further includes means for processing, by the UE, the transmission of RMSI based on the type of multiplexing and the periodicity.

In another aspect, a user equipment (UE) is provided. For example, the UE may include at least one processor in electrical communication with a communications interface and at least one memory coupled to the at least one processor. The at least one processor is configured to identify, by the communications interface, an indicator that signals a type of multiplexing and a periodicity for transmission, by a base station, of remaining minimum system information (RMSI), wherein the type of multiplexing is for multiplexing the RMSI with a synchronization signal SS block. The at least one processor is also configured to determine, by the UE, the type of multiplexing and the periodicity based on the indicator. The at least one processor is further configured to process, by the UE, the transmission of RMSI based on the type of multiplexing and the periodicity.

In another aspect, a computer-readable medium is provided. For example, the computer-readable medium has instructions recorded thereon that, when enacted by one or more computer processors, cause the one or more computer processors to identify, by a user equipment (UE), an indicator that signals a type of multiplexing and a periodicity for transmission, by a base station, of remaining minimum system information (RMSI), wherein the type of multiplexing is for multiplexing the RMSI with a synchronization signal SS block. The instructions also cause the one or more computer processors to determine, by the UE, the type of multiplexing and the periodicity based on the indicator. The instructions further cause the one or more computer processors to process, by the UE, the transmission of RMSI based on the type of multiplexing and the periodicity.

In another aspect, a wireless communication apparatus has at least one processor and at least one memory coupled to the at least one processor. The at least one processor is configured to identify, by a user equipment (UE), an indicator that signals a type of multiplexing and a periodicity for transmission, by a base station, of remaining minimum system information (RMSI), wherein the type of multiplexing is for multiplexing the RMSI with a synchronization signal SS block. The at least one processor is additionally configured to determine, by the UE, the type of multiplexing and the periodicity based on the indicator. The at least one processor is also configured to process, by the UE, the upcoming transmission of RMSI based on the type of multiplexing and the periodicity.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4A is a block diagram illustrating example blocks of a method of wireless communication for a base station according to some embodiments of the present disclosure.

FIG. 4B is a block diagram illustrating example blocks of another method of wireless communication for a base station according to some embodiments of the present disclosure.

FIG. 5A is a block diagram illustrating example blocks of a method of wireless communication for a user equipment (UE) according to some embodiments of the present disclosure.

FIG. 5B is a block diagram illustrating example blocks of another method of wireless communication for a UE according to some embodiments of the present disclosure.

DETAILED DESCRIPTION

Figure 1:
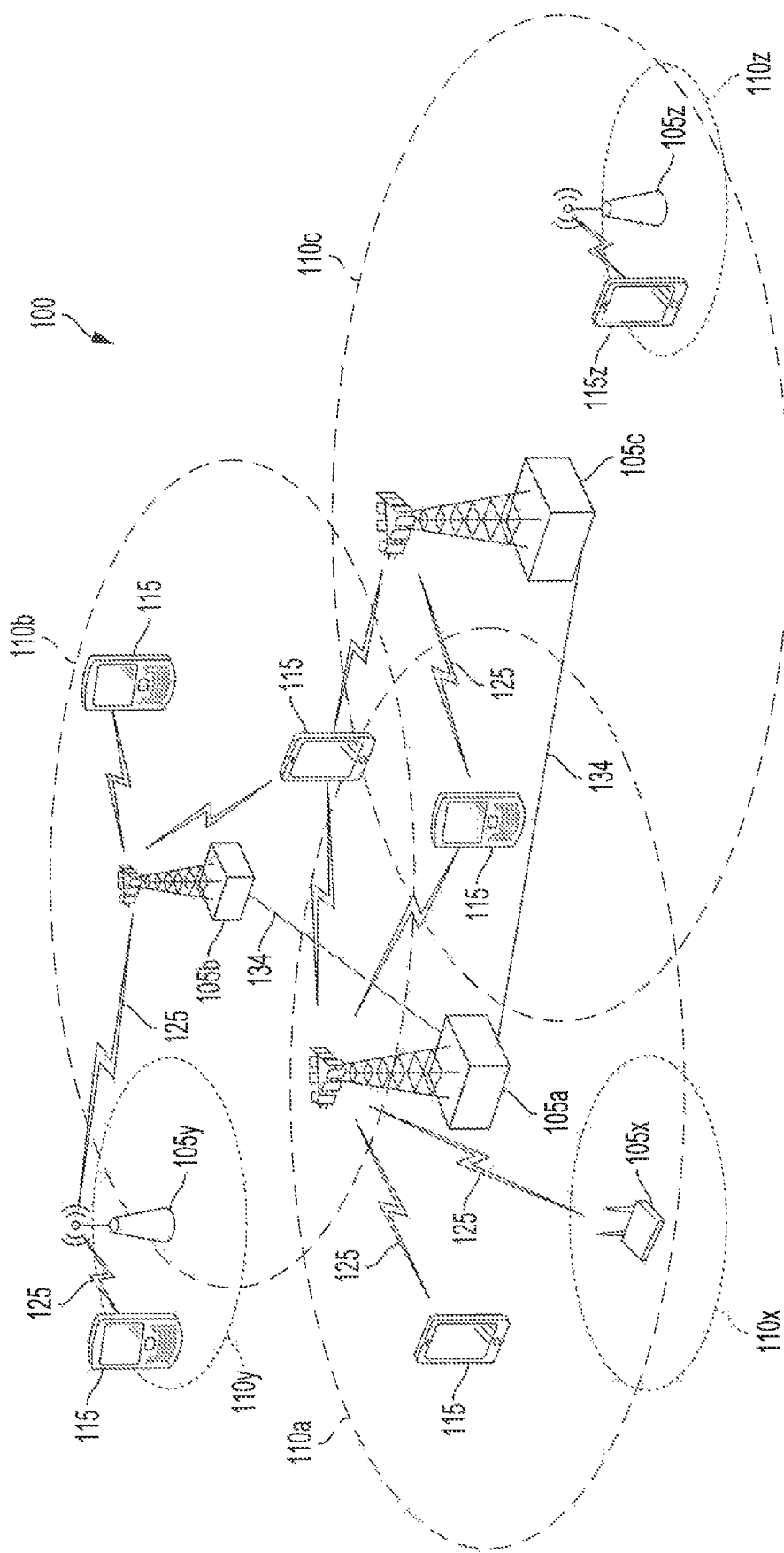
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to both NR (new radio) or exemplary LTE implementations. These explanations or merely exemplary in nature. Thus, though some descriptions may be provided in an LTE-centric way, and LTE terminology may be used as illustrative examples in portions of the description below; however, the description is not intended to be limited to LTE applications. And the same with descriptions provided with NR or 5G terminology. As a result, the present disclosure is concerned with shared access to wireless spectrum between networks using different radio access technologies or radio air interfaces. Further deployments can utilize one or both of licensed and unlicensed spectrum scenarios, and over a range of frequencies (e.g., Sub-6 GHz to mmWave).

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) or new radio (NR) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1, the wireless network 100 can include a number of base stations. These can comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are generally dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA).

A mobile apparatus may additionally be an "Internet of things" (IoT) device. Devices belonging to the IoT category can include components or devices such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
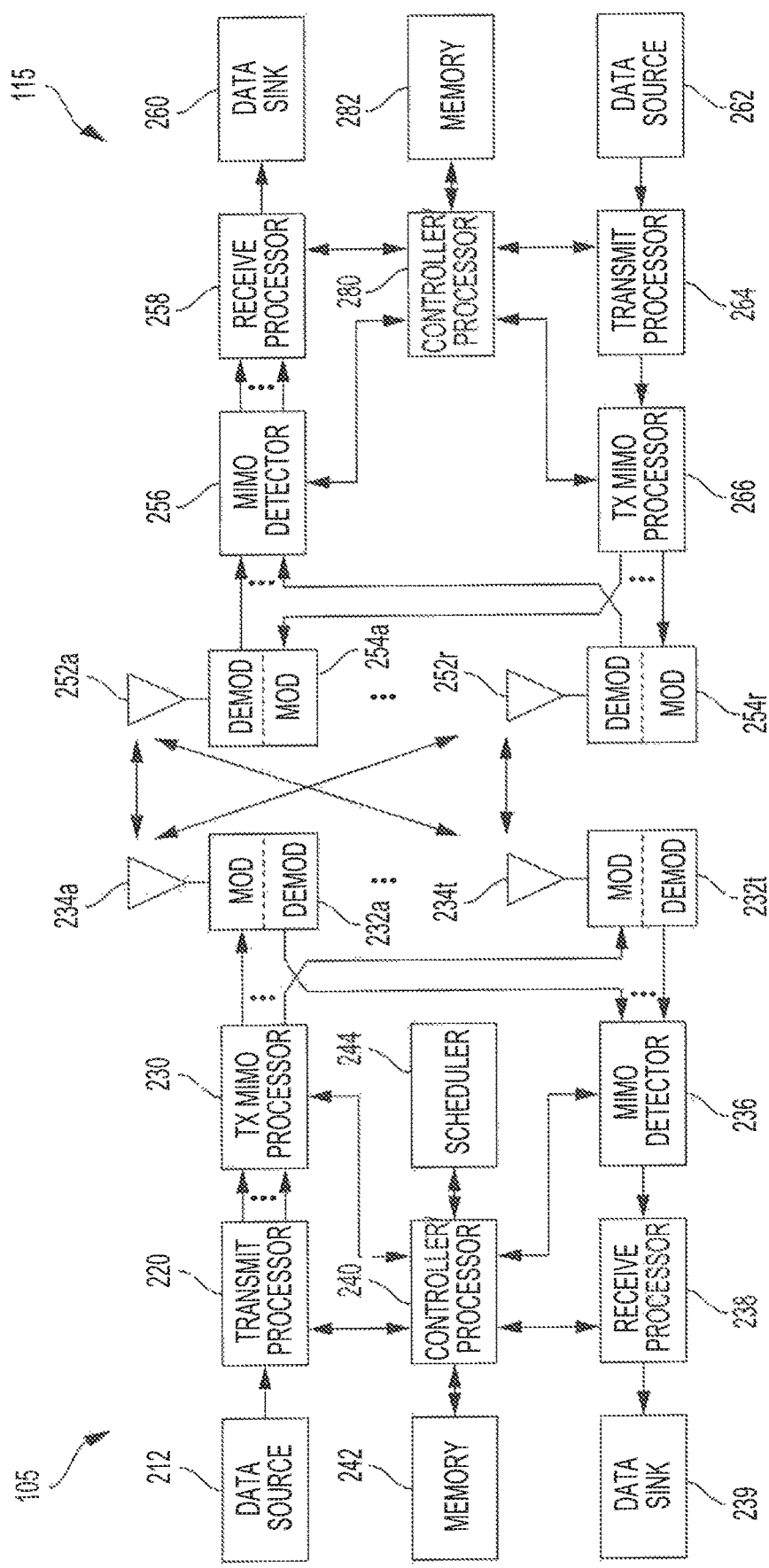
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process input samples (e.g., for OFDM, etc.) to obtain received symbols. MIMO detector 256 may obtain received symbols from all demodulators 254a through 254r, perform MIMO detection on received symbols if applicable, and provide detected symbols. Receive processor 258 may process (e.g., demodulate, deinterleave, and decode) detected symbols, provide decoded data for UE 115 to data sink 260, and provide decoded control information to controller/processor 280.

On an uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 4A, 4B, 5A, and 5C, and/or other processes for the techniques described herein. Memories 242 and 282 may store data and program codes for gNB 105 and UE 115, respectively. Scheduler 244 may schedule UEs for data transmission on the downlink and/or uplink.

As noted above, in new radio (NR), remaining minimum system information (RMSI) is used to carry system information (SI). The physical broadcast channel (PBCH) master information block (MIB) carries a first part of system information that a user equipment (UE) needs in order to access the system. The RMSI carries all of the remaining system information that is needed by the UE to access the system. In this way, RMSI is similar to system information blocks (SIBs) SIB1 and SIB2 in long term evolution (LTE).

Yet some design aspects for the RMSI methodology in NR are different from and contain new features relative to aspects of LTE SIB transmission. For instance, in LTE, SIB1 has a fixed periodicity and time location, whereas SIB2 has a configurable periodicity signaled in SIB1 (mapped to fixed time location) but no monitoring window. Additionally, SIB3 and other SIBs have a configurable periodicity and a configurable monitoring window (e.g., 10 milliseconds). SIB 3,4 can be transmitted in any subframe in the monitoring window, and the UE has to monitor for this transmission. In NR, RMSI can have similar aspects with RMSI corresponding to each synchronization signal (SS) block and be defined either as mapped to fixed location in time or mapped to a subset of slots within a monitoring window.

Figure 3A:
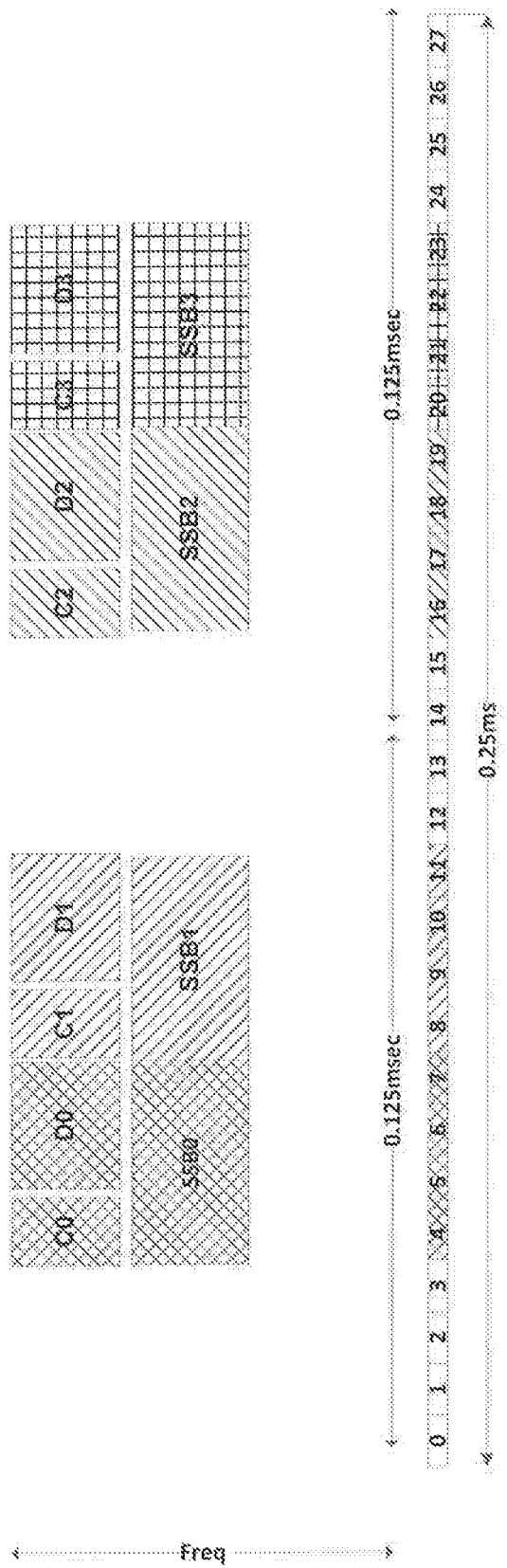
FIG. 3A is a block diagram illustrating a frequency division multiplexing (FDM) of RMSI with an SS block according to some embodiments of the present disclosure.

Various embodiments and modes can be utilized for multiplexing RMSI with an SS block. For example, referring to FIG. 3A, RMSI CORESETs C0-C3 and RMSI data D0-D3 may be multiplexed with one or more SS blocks SSB0-SSB3 using frequency division multiplexing (FDM). In the example of FIG. 3A, each pair of RMSI coreset and RMSI data for a particular RMSI may each be multiplexed in the frequency domain with a particular SS block. In this way, the RMSI CORESET and data pair can have a fixed location with respect to its corresponding SS block, and have a default periodicity that corresponds to a periodicity of the SS block.

Figure 3B:
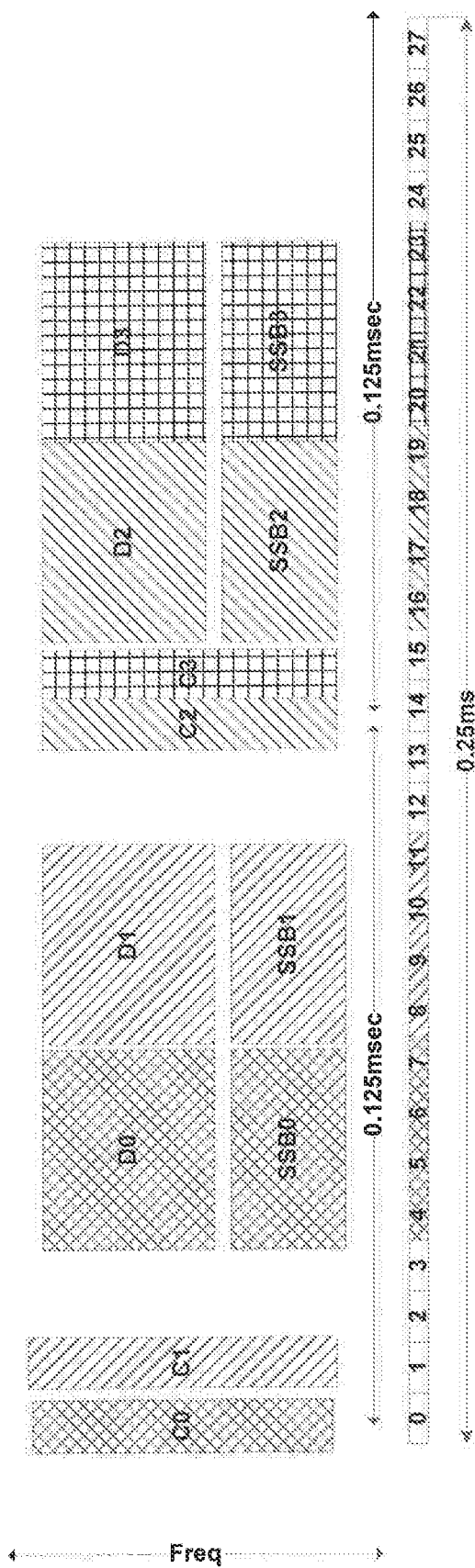
FIG. 3B is a block diagram illustrating another FDM of RMSI with an SS block according to some embodiments of the present disclosure.

Turning to FIG. 3B, another example demonstrates an IntraSlotTDM mode in which the RMSI CORESETs C0-C3 are time division multiplexed (TDMed) with the SS blocks SSB0-SSB3 but are in the same slot. As shown, the multiplexing of RMSI Data D0-D3 is not signaled via PBCH, but is instead signaled via PDCCH grants in the RMSI CORESETs C0-C3. In this example, the RMSI data D0-D3 is FDMed with the SS blocks SSB0-SSB3. RMSI CORESETs C0-C3 may reside in the frequency band corresponding to a frequency band of either or both SS blocks SSB0-SSB3 and RMSI data D0-D3. FIG. 3B illustrates an example in which RMSI CORESETs C0-C3 reside in the frequency band corresponding to the frequency band of both SS blocks SSB0-SSB3 and RMSI data D0-D3.

Figure 3C:
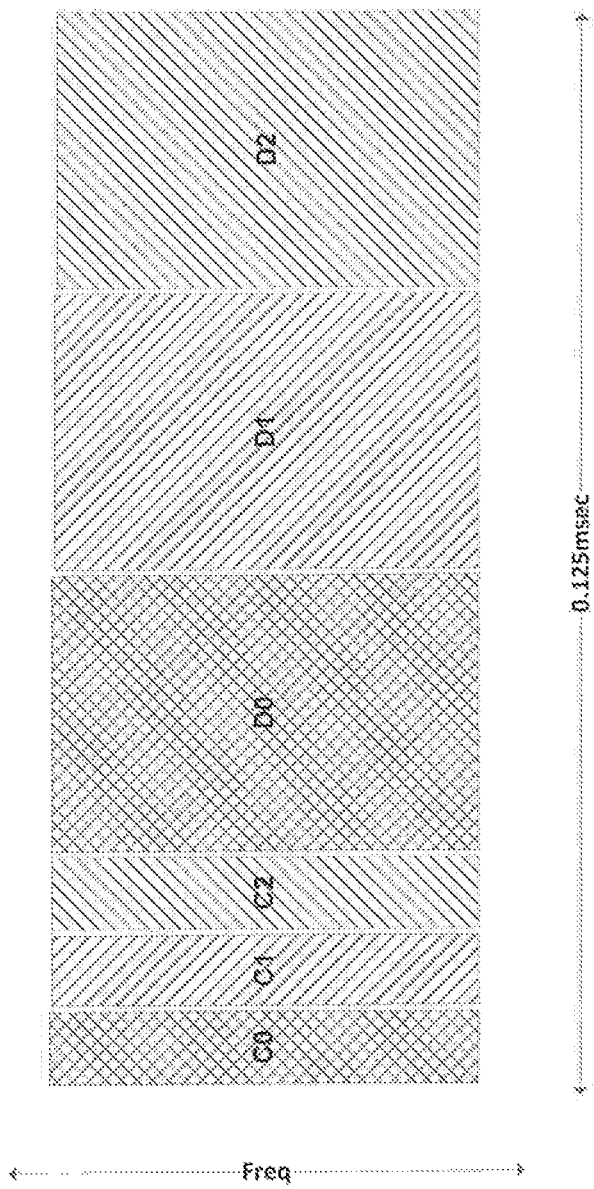
FIG. 3C is a block diagram illustrating a time division multiplexing (TDM) of RMSI with an SS block according to some embodiments of the present disclosure.

Turning to FIG. 3C, yet another example demonstrates a TDM mode in which the RMSI CORESETs C0-C3 are TDMed with SS blocks but in a different slot or slots. For example, a configurable monitoring window may be used to allow the base station to place the RMSI in a presently convenient location with respect to the SS blocks. Additionally, for such a TDM mode or a similar type of TDM mode, the periodicity and/or monitoring window duration may be configurable. Also, this type of TDM mode or a similar type of TDM mode may be advantageous in systems having bandwidth below a given threshold, such as one-hundred MHz.

As mentioned above, different multiplexing modes may be more or less advantageous depending on various factors, such as available bandwidth or desired operational characteristics. Accordingly, a base station may need the capability to configure a multiplexing mode at need. An issue that arises in this context is how a UE may determine a multiplexing mode and thus successfully detect and process the RMSI needed to access a communications network (sometimes referred to as the system).

Embodiments discussed herein can address such challenges in a variety of manners. For example, example solutions can include providing communication components configured for signaling and/or controlling to account for a variety of multiplexing scenarios. As a particular example, a base station can signal a mode and a periodicity to a UE by using an indicator. The indicator may be a field provided in a MIB of PBCH. To reduce consumption of MIB resources, an indicator may be an N bit indicator (e.g., N=2 or 3) that is jointly coded. Jointly coding scenarios may include the ability to, with each two or three bit value, include a multiplexing mode and a periodicity. As another example, a periodicity may be a default value for FDM and one of a few configurable periodicities for TDM. In other examples, periodicities may each be a multiple of a base periodicity, such as twenty milliseconds. An example of joint coding for a two bit field is demonstrated below in Table 1. Additional or alternative periodicities and/or monitoring window durations may be signaled by joint coding using an N bit indicator.

TABLE 1

| Two Bit Value | Multiplexing Mode | Monitoring Periodicity |
|---|---|---|
| 00 | FDM | Default SS Block Periodicity |
| 01 | TDM | 20 msec |
| 10 | TDM | 40 msec |
| 11 | TDM | 80 msec |

Turning now to FIG. 4A, a method of wireless communication for a base station processor, such as a baseband processor or BS controller, may begin at block 400A, At block 400A, the base station may determine a type of multiplexing and a periodicity for transmission of remaining minimum system information (RMSI). Also, the base station may determine a duration of a configurable monitoring window based on the indicator. As described above, the type of multiplexing is for multiplexing the RMSI with a synchronization signal (SS) block. Additionally or alternatively, the base station may determine the type of multiplexing based on available bandwidth for transmitting the RMSI multiplexed with the SS block.

The determination performed by the base station at block 400A may have one of a few outcomes. For example, the base station may determine the type of multiplexing to be FDM and the periodicity to be a default periodicity that corresponds to a periodicity of the SS block. Alternatively or additionally, the base station may determine the type of multiplexing to be TDM and the periodicity to be a configurable periodicity. Further, the base station may determine the periodicity to be one of two or more predetermined periodicities or a configurable periodicity ranging between a set of predetermined values The base station may make the determination, at block 400A, based on available bandwidth for transmitting the RMSI multiplexed with the SS block. Processing may proceed from block 400A to block 402A.

At block 402A, the base station may generate an indicator that signals the type of multiplexing and the periodicity. For example, the base station may generate the indicator to signal the determined duration of the monitoring window. Alternatively or additionally, the base station may generate the indicator by setting one or more bits in a MIB of a PBCH. Alternatively or additionally, The base station may generate the indicator as a jointly coded indicator Referring to FIG. 4B, another method of wireless communication for a base station processor, such as a telecommunications processor or BS controller, may begin at block 400B and proceed to block 402B, in which the base station may perform operations similar to those described above with respect to blocks 400A and 402A. However, processing may proceed from block 402B to block 404B, in which the base station may broadcast the indicator. For example, the base station may multiplex the indicator generated at block 402B with the SS block on PBCH according to the multiplexing mode and periodicity determined at block 400B. Accordingly, the indicator may be broadcast in the MIB of PBCH. Also, at block 406B, the base station may broadcast the transmission of the RMSI multiplexed with the SS block.

Turning now to FIG. 5A, a method of wireless communication for a UE processor, such as a baseband processor or UE controller, may begin at block 502A, At block 502A, the UE may identify an indicator that signals a type of multiplexing and a periodicity for transmission, by a base station, of RMSI. For example, the UE may have received a transmission containing data that includes the indicator. Accordingly, the UE may have stored data of the transmission in memory. Thus, the UE may identify the indicator by analyzing the data stored in the memory and recognizing the indicator in a predetermined location within the data or with respect to a reference value. As noted above, the type of multiplexing is for multiplexing the RMSI with a synchronization signal SS block. In some aspects, the UE may identify an indicator that signals a duration of a monitoring window for the RMSI. Alternatively or additionally, the UE may identify the indicator as one or more bits in a MIB of a PBCH. Alternatively or additionally, the UE may identify the indicator as a jointly coded indicator, as described above. Processing may proceed from block 502A to block 504A.

At block 504A, the UE may determine the type of multiplexing and the periodicity based on the indicator. For example, the UE may determine the type of multiplexing to be FDM and the periodicity to be a default periodicity that corresponds to a periodicity of the SS block. Alternatively or additionally, the UE may determine the type of multiplexing to be time division multiplexing (TDM) and the periodicity to be a configurable periodicity. For example, the UE may determine the periodicity to be one of two or more predetermined periodicities or a configurable periodicity ranging between a set of predetermined values. Processing may proceed from block 504A to block 508A.

At block 508A, the UE may process an upcoming transmission of RMSI based on the type of multiplexing and the periodicity. Sample types include FDM with a default periodicity, TDM with a 20 ms periodicity, TDM with a 40 ms periodicity, and TDM with an 80 ms periodicity. Also, the UE may process the upcoming transmission of RMSI further based on the duration.

Turning to FIG. 5B, another method of wireless communication for a UE processor, such as a telecommunications processor, may include blocks 502B, 504B, and 508B, in which the base station may perform operations similar to those described above with respect to blocks 502A, 504A, and 508A. However, processing may begin at block 500B, in which the UE may receive the indicator. For example, the UE may receive a PBCH having a MIB containing the indicator, as described above. Processing may proceed from block 500B to block 502B.

Processing may also proceed from block 504B to block 506B, in which the UE may receive the transmission. For example, the UE may receive the transmission on the PBCH having the MIB in which the indicator is contained. Processing may proceed from block 506B to block 508B.

Figure 6:
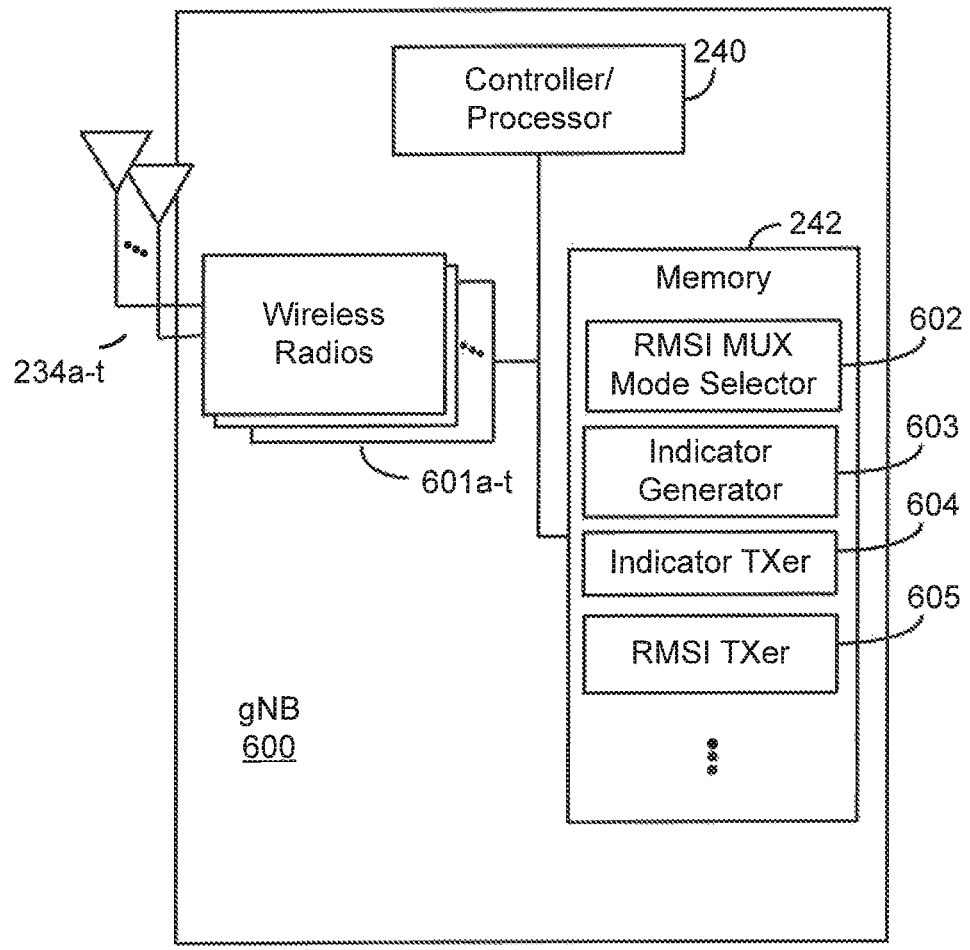
FIG. 6 is a block diagram illustrating a base station according to some embodiments of the present disclosure.

Turning now to FIG. 6, a base station 600, such as a NR-SS base station 105 (see FIG. 2), may have a controller/processor 240, a memory 242, and antennas 234a through 234t, as described above. The base station 600 may also have wireless radios 601a to 601t that comprise additional components also described above with reference to FIG. 2. The memory 242 of base station 600 stores algorithms that configure processor/controller 240 to carry out procedures as described above in FIGS. 4A and 4B.

Algorithms stored by memory 242 configure processor/controller 240 to carry out operations relating to an indicator of RMSI multiplexing type and periodicity, as previously described. For example, RMSI multiplexing mode and periodicity selector 602 configures controller processor 240 to carry out operations that include determining the multiplexing mode and the periodicity in any manner previously described. Additionally, indicator generator 603 configures controller processor 240 to carry out operations that include generating the indicator in any manner previously described. Further, indicator transmitter 604 configures controller processor 240 to carry out operations that include transmitting the indicator in any manner previously described. Also, RMSI transmitter 605 configures controller processor 240 to carry out operations that include transmitting the RMSI in any manner previously described.

Figure 7:
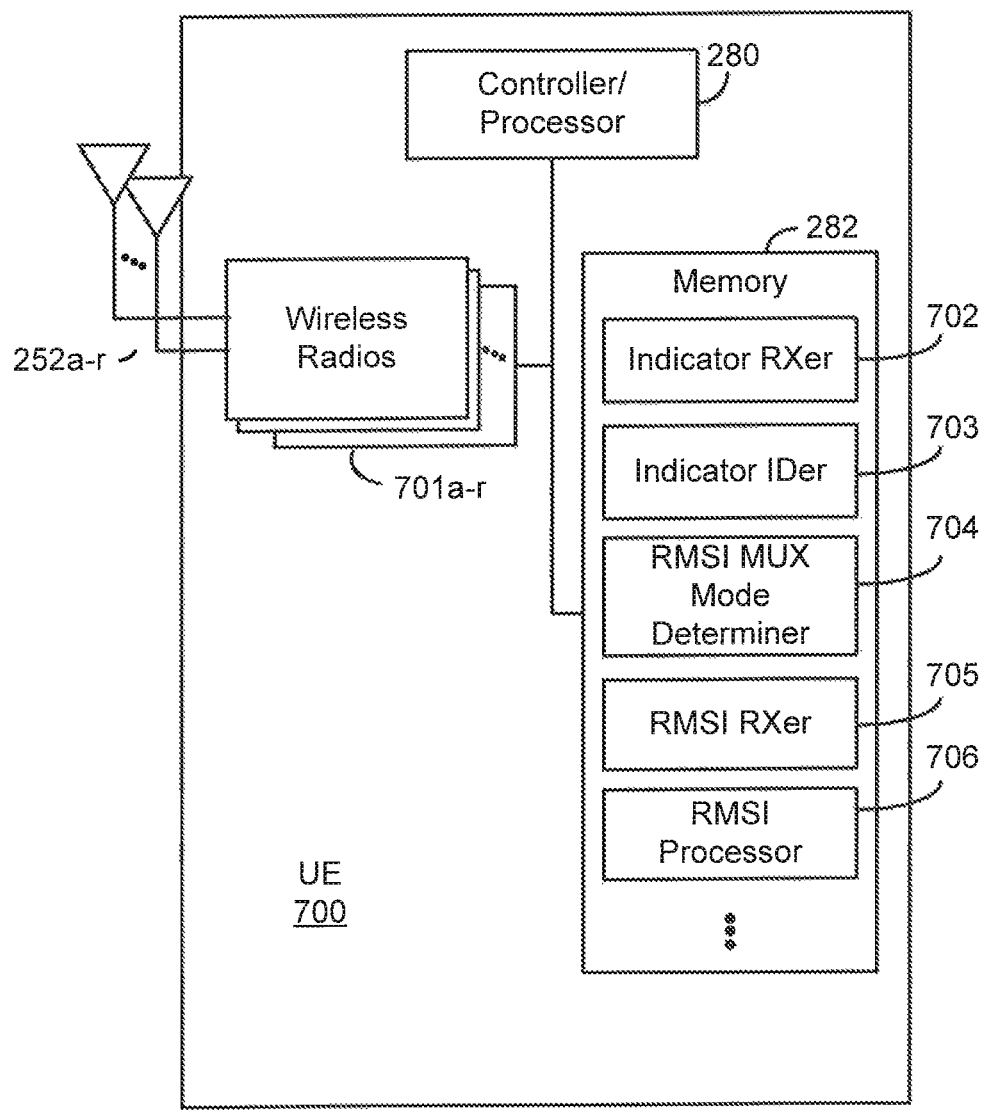
FIG. 7 is a block diagram illustrating a UE according to some embodiments of the present disclosure.

Turning now to FIG. 7, a UE 700, such as a UE 105 (see FIG. 2), may have a controller/processor 280, a memory 282, and antennas 252a through 252r, as described above. UE 700 may also have wireless radios 701a to 701r that comprise additional components also described above with reference to FIG. 2. The memory 282 of UE 700 stores algorithms that configure processor/controller 280 to carry out procedures as described above in FIGS. 5A and 5B.

Algorithms stored by memory 282 configure processor/controller 280 to carry out procedures relating to use of the RMSI indicator by the UE 700, as previously described. For example, indicator receiver 702 configures controller processor 280 to carry out operations that include receiving the indicator in any manner previously described. Additionally, indicator identifier 703 configures controller processor 280 to carry out operations that include identifying the indicator in any manner previously described. Also, RMSI multiplexing mode determiner 704 configures controller processor 280 to carry out operations that include determining the type of multiplexing and the periodicity. Further, RMSI receiver 705 configures controller processor 280 to carry out operations that include receiving the RMSI in any manner previously described. Still further, RMSI processor 706 configures controller processor 280 to carry out operations that include processing the upcoming transmission in any manner previously described.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2, FIG. 4A, FIG. 4B, FIG. 5A, FIG. 5B, FIG. 6, and FIG. 7) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   identifying, by a user equipment (UE), an indicator that signals a type of multiplexing of remaining minimum system information (RMSI), wherein the type of multiplexing is for multiplexing the RMSI with a synchronization signal (SS) block, wherein the indicator is identified as one or more bits in a master information block (MIB), and wherein the type of multiplexing and a periodicity of transmission of the RMSI are jointly encoded in the one or more bits in the MIB such that the jointly encoded one or more bits directly indicates both the type of multiplexing and the periodicity of transmission of the RMSI;
   determining, by the UE, the type of multiplexing based on the indicator;
   determining, based on the indicator, the type of multiplexing and the periodicity of transmission of the RMSI; and
   processing, by the UE, a transmission of RMSI based on the type of multiplexing.

2. The method of claim 1, further comprising determining, based on the indicator, the periodicity of transmission of the RMSI to be one of two or more predetermined periodicities or within a range between a set of predetermined values.

3. The method of claim 1, further comprising:
   processing, by the UE, the transmission of RMSI further based on a duration of a monitoring window for the RMSI that is signaled by the indicator.

4. The method of claim 1, further comprising receiving, by the UE, at least one of:
   the indicator; or
   the transmission.

5. A user equipment (UE), comprising:
   at least one processor coupled to a communications interface; and
   at least one memory coupled to the at least one processor, wherein the at least one processor is configured to:
      identify, by the UE, an indicator that signals a type of multiplexing of remaining minimum system information (RMSI), wherein the type of multiplexing is for multiplexing the RMSI with a synchronization signal (SS) block, wherein the indicator is identified as one or more bits in a master information block (MIB), and wherein the type of multiplexing and a periodicity of transmission of the RMSI are jointly encoded in the one or more bits in the MIB such that the jointly encoded one or more bits directly indicates both the type of multiplexing and the periodicity of transmission of the RMSI;
      determine, by the UE, the type of multiplexing based on the indicator;
      determine, based on the indicator, the type of multiplexing to be frequency division multiplexing (FDM) and the periodicity of transmission of the RMSI to be a default periodicity that corresponds to a periodicity of the SS block; and
      process, by the UE, a transmission of RMSI based on the type of multiplexing.

6. The UE of claim 5, wherein the at least one processor is further configured to determine, based on the indicator, the periodicity of transmission of the RMSI to be one of two or more predetermined periodicities or within a range between a set of predetermined values.

7. The UE of claim 5, wherein the at least one processor is further configured to receive, by the UE, the indicator.

8. The UE of claim 5, wherein the at least one processor is configured to receive, by the UE, the transmission.

9. A method of wireless communication, the method comprising:
   determining, by a base station, a type of multiplexing for transmission of remaining minimum system information (RMSI), wherein the type of multiplexing is for multiplexing the RMSI with a synchronization signal (SS) block;
   determining the type of multiplexing and a periodicity of transmission of the RMSI; and
   generating, by the base station, an indicator that signals the type of multiplexing and the periodicity for transmission of the RMSI by setting one or more bits in a master information block (MIB) to jointly encode the type of multiplexing and the periodicity for transmission of the RMSI such that the one or more bits directly indicates both the type of multiplexing and the periodicity of transmission of the RMSI, wherein the indicator signals the type of multiplexing and the periodicity for the transmission of the RMSI.

10. The method of claim 9, further comprising determining the periodicity for transmission of the RMSI to be one of two or more predetermined periodicities or within a range between a set of predetermined values, wherein the indicator signals the periodicity for transmission of the RMSI to be the one of two or more predetermined periodicities or within the range between the set of predetermined values.

11. The method of claim 9, further comprising:
   determining a duration of a monitoring window for the RMSI; and
   generating the indicator to signal the duration.

12. The method of claim 9, further comprising determining the type of multiplexing based on available bandwidth for transmitting the RMSI multiplexed with the SS block.

13. The method of claim 9, further comprising broadcasting, by the base station, the indicator.

14. A base station, comprising:
   at least one processor; and
   at least one memory coupled to the at least one processor, wherein the at least one processor is configured to:
      determine, by the base station, a type of multiplexing for transmission of remaining minimum system information (RMSI) to be frequency division multiplexing (FDM), wherein the type of multiplexing is for multiplexing the RMSI with a synchronization signal (SS) block, wherein a periodicity for transmission of the RMSI is a default periodicity that corresponds to a periodicity of the SS block; and generate, by the base station, an indicator that signals the type of multiplexing and the periodicity for transmission of the RMSI by setting one or more bits in a master information block (MIB) to jointly encode the type of multiplexing and the periodicity for transmission of the RMSI such that the one or more bits directly indicates both the type of multiplexing and the periodicity of transmission of the RMSI, wherein the indicator signals the type of multiplexing to be FDM and the periodicity for transmission of the RMSI to be the default periodicity that corresponds to the periodicity of the SS block.

15. The base station of claim 14, wherein the at least one processor is further configured to determine the periodicity for transmission of the RMSI to be one of two or more predetermined periodicities or within a range between a set of predetermined values, and wherein the indicator signals the periodicity for transmission of the RMSI to be the one of two or more predetermined periodicities or within the range between the set of predetermined values.

16. The base station of claim 14, wherein the at least one processor is further configured to:
   determine a duration of a monitoring window for the RMSI; and
   generate the indicator to signal the duration.

17. The base station of claim 14, wherein the at least one processor is further configured to broadcast, by the base station, the indicator.

18. A wireless communication apparatus, comprising:
at least one processor; and
at least one memory coupled to the at least one processor, wherein the at least one processor is configured to:
   identify, by the wireless communication apparatus, an indicator that signals a type of multiplexing of remaining minimum system information (RMSI), wherein the type of multiplexing is for multiplexing the RMSI with a synchronization signal (SS) block, wherein the indicator is identified as one or more bits in a master information block (MIB), and wherein the type of multiplexing and a periodicity of transmission of the RMSI are jointly encoded in the one or more bits in the MIB such that the jointly encoded one or more bits directly indicates both the type of multiplexing and the periodicity of transmission of the RMSI;
   determine, by the wireless communication apparatus, the type of multiplexing and the periodicity of transmission of the RMSI based on the indicator; and
   process, by the wireless communication apparatus, a transmission of RMSI based on the type of multiplexing.

19. The wireless communication apparatus of claim 18, wherein the at least one processor is further configured to determine, based on the indicator, the periodicity of transmission of the RMSI to be within a range between a set of predetermined values.

* * * * *